United States Patent [19]

Wu et al.

[11] Patent Number: 4,603,186

[45] Date of Patent: Jul. 29, 1986

[54] TETRAPOLYMERS CONTAINING INDENE

[75] Inventors: Muyen M. Wu, Hudson; Elmer J. De Witt, Cuyahoga Falls; George S. Li, Solon, all of Ohio

[73] Assignee: The Standard Oil Company, Cleveland, Ohio

[21] Appl. No.: 789,529

[22] Filed: Oct. 21, 1985

[51] Int. Cl.$^4$ .................. C08L 212/10; C08L 220/14; C08L 220/42; C08L 232/08
[52] U.S. Cl. ..................................... 526/280; 525/211
[58] Field of Search ........................................ 526/280

[56] References Cited

U.S. PATENT DOCUMENTS

| 4,074,037 | 2/1978 | Li | 526/280 |
| 4,074,038 | 2/1978 | Li | 526/280 |
| 4,136,246 | 1/1979 | Li | 526/267 |

*Primary Examiner*—Carman J. Seccuro

*Attorney, Agent, or Firm*—Charles S. Lynch; John E. Miller; Larry W. Evans

[57] ABSTRACT

Low viscosity, random tetrapolymers that are the result of addition polymerization of the monomers acrylonitrile, methyl methacrylate, α-methylstyrene and/or styrene, and indene, containing the monomers combined in the polymer structure in the following weight percentages:

|  | Weight Percent |
|---|---|
| Acrylonitrile | 10–40 |
| Methyl methacrylate | 5–50 |
| Indene | 3–50 |
| α-methylstyrene or styrene or a mixture of both | 5–50 | wherein said tetrapolymers have an inherent viscosity in the range from 0.08 to 0.4 deciliters per gram of polymer solution.

5 Claims, No Drawings

TETRAPOLYMERS CONTAINING INDENE

This invention relates to novel low viscosity tetrapolymers containing indene.

It is an object of the present invention to provide new tetrapolymers having low inherent viscosities, which polymers have polymers have a wide range of utilities.

Other objects, as well as aspects, features and advantages, of the present invention will become apparent from a study of the specification, including the examples and the claims.

According to the present invention there are provided low viscosity, normally solid, random tetrapolymers that are the result of addition polymerization of the monomers acrylonitrile, methyl methacrylate, α-methylstyrene and/or styrene, and indene, containing the monomers combined in the polymer structure in the following weight percentages:

|  | Weight Percent |
|---|---|
| Acrylonitrile | 10–40 |
| Methyl methacrylate | 5–50 |
| Indene | 3–50 |
| α-methylstyrene or styrene or a mixture of both | 5–50 | wherein said tetrapolymers have an inherent viscosity in the range from 0.08 to 0.4 deciliters per gram of polymer solution, more usually in the range 0.1 to 0.36 deciliters.

Inherent viscosities in this application (including the claims) are always expressed in deciliters per gram, measured at 25° C., 0.2 grams of the polymer in 100 cc of dimethylformamide for the tetrapolymers, and in the case of the PVC, using 0.2 grams of the PVC in 100 cc of cyclohexanone.

The tetrapolymers of the invention are all useful in a number of applications: as extenders for butadiene-acrylonitrile copolymer rubbers of commerce; as hot melt adhesives for general purposes but especially for adhering to acrylonitrile copolymer plastics; as processing aids for poly(vinyl chloride) resin, making it easier to physically work the PVC when used in amounts of, for instance 1-5 weight percent of the PVC; and as a potting compound or an encapsulating medium for various electric or electronic components and the like.

Moreover, the random addition tetrapolymers of the invention that contain the following monomers combined in the polymer structure in the following weight percentages:

|  | Weight Percent |
|---|---|
| Acrylonitrile | 15–35 |
| Methyl methacrylate | 5–45 |
| Indene | 5–45 |
| α-methylstyrene or styrene or a mixture of both | 5–45 | where the total weight percent of combined indene plus α-methyl styrene plus styrene in the tetrapolymer is 38-70, usually 45-60, are especially useful in blends with poly(vinyl chloride) resins, especially those used for injection molding and those used for extrusion molding.

For this use the tetrapolymers of the invention more usually contain the monomers combined in the polymer structure in the following weight percentages:

|  | Weight Percent |
|---|---|
| Acrylonitrile | 20–30 |
| Methyl methacrylate | 15–30 |
| Indene | 10–30 |
| α-methylstyrene plus styrene | 15–40 | where the total weight percent of combined indene plus α-methyl styrene plus styrene is 38-70, usually 45-60.

It is an advantage of our tetrapolymers that they are low molecular weight polymers, as generally indicated by their low inherent viscosities. This automatically results from the influence of the monomer, indene, on the course of the polymerization; thus indene seems to act as an automatic chain transfer agent. As a result, the polymers used in making the blends of the invention have an inherent viscosity of 0.08 to 0.4, usually 0.10 to 0.36 deciliters per gram. Because of this characteristic of the tetrapolymers, their blends with vinyl chloride polymers result in a polymer blend having not only a higher HDT than the vinyl chloride polymer, but also a much higher melt index. The blends of the invention thus not only greatly increase the HDT but also are much more easily mechanically worked because of the high melt index. The utility of the present tetrapolymers in PVC blends is illustrated in several specific examples herein.

The new polymers of the invention are all useful in particulate form as pigments in paint. They can be used, for instance, in the following paint formula:

| Ingredient | Lbs. |
|---|---|
| Tetrapolymer | 100 |
| Titanium dioxide | 110 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% Pb) | 3 |
| Calcium naphthenate (4% Ca) | 2 |

We are aware of a number of U.S. patents that disclose copolymers and terpolymers that contain both indene and acrylonitrile:

| | |
|---|---|
| 3,926,817 | 4,077,047 |
| 3,926,926 | 4,082,819 |
| 3,947,527 | 4,091,199 |
| 3,950,454 | 4,107,237 |
| 3,997,709 | 4,121,807 |
| 4,020,128 | 4,136,246 |
| 4,074,037 | 4,153,648 |
| 4,074,038 | 4,195,135 |

Most of these polymers, however, have 50 percent or more acylonitrile. None of the patents disclose low inherent viscosity polymers. One of these, U.S. Pat. No. 4,074,038, discloses terpolymers containing acrylonitrile, styrene or α-methyl styrene and indene, but no methyl methacrylate. Nothing in the prior art known to us points to our tetrapolymers or suggests the desirable properties thereof, which properties are discussed, infra.

Properties reported in this application were determined by the procedures of the following ASTM designations:

| | |
|---|---|
| Heat Distortion Temperature | ASTM D 648 (264 psi, unannealed) |
| Tensile Strength | ASTM D 638 (Modified) |
| Flexural Strength | ASTM D 790 |
| Flexural Modulus | ASTM D 790 |
| Melt Index | ASTM D 1238 |

The following examples of the compositions of the invention are merely illustrative and are not to be considered limiting.

In the examples, unless otherwise stated, the PVC used in the blends was an injection grade PVC having an inherent viscosity of 0.68 deciliters/gm. for a 0.2 weight percent solution in cyclohexanone, and when stabilized with 3 parts by weight of Thermolite 813 per 100 parts of PVC, the PVC had a tensile strength of 8,500 psi, and HDT of 70° C., a flexural strength of 12,400 psi, a flexural modulus of 430,000 psi, a notched Izod of 0.26 ft-lbs/sq. in., and a melt index of 0.6 grams/10 minutes.

In the examples, Thermolite 813 is di-n-octyltin maleate polymer sold by M & T Chemicals Inc. having the formula $$((C_8H_{17})_2SnCH_2O_4)_n$$

having a melting point of 90° C. and specific gravity of 0.6. It is a commonly used thermal stabilizer.

EXAMPLE A

A tetrapolymer was made by suspension polymerization according to the following recipe. Amounts are in weight parts per 100 parts of total monomers.

| PHM | Components |
|---|---|
| 150 | H₂O |
| 0.6 | 2,2′-azobis(2,4-dimethylvaleronitrile) |
| 0.2 | Hydroxylethylcellose (suspending agent) |
| 20 | Acrylonitrile |
| 15 | Methyl Methacrylate |
| 15 | α-Methylstyrene |
| 50 | Indene |

150 parts by weight of distilled water, 0.2 parts of HEC (which has been dissolved in water), 0.2 parts of 2,2′-azobis(2,4-dimethylvaleronitrile), 20 parts of Acrylonitrile, 5 parts of methyl methacrylate, 5 parts of α-methylstyrene, and 47.5 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2′-azobis(2,4-dimethylvaleronitrile), 10 parts of methyl methacrylate, 10 parts of α-methylstyrene and 2.5 parts of indene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 40% yield. The composition of the polymer was 15 acrylonitrile, 19 methyl methacrylate, 41 α-methylstyrene and 25 indene as determind by C¹³ NMR. The inherent viscosity was 0.132.

25 parts by weight of the tetrapolymer was mixed with 75 parts of injection grade PVC and 3 parts of Thermolite 813 by a blender. The mixture was kneaded for 5 minutes with mixing brabender having a surface temperature of 190° C. The resulting blend was press formed at 190° C. into a sheet, then a plaque. Each resin plaque thus prepared was tested for HDT, melt index, tensile strength and other physical properties.

The HDT was 81° C., the melt index was 5.5 g./10 min, the tensile strength was 9,200 psi, the flexural strength was 7,400 psi and the flexural modulus 440,000 psi.

The melt index of a blend made with 65 parts of PVC and 35 parts of the tetrapolymer was 10.6 g./10 min. and the HDT was 82.5° C.

EXAMPLE B

A tetrapolymer was made by suspension polymerization according to the following recipe. Amounts are in weight parts per 100 parts of total monomers.

| PHM | Components |
|---|---|
| 150 | H₂O |
| 0.6 | 2,2′-azobis(2,4-dimethylvaleronitrile) |
| 0.2 | Hydroxylethylcellose (suspending agent) |
| 25 | Acrylonitrile |
| 10 | Methyl Methacrylate |
| 20. | α-Methylstyrene |
| 45 | Indene |

150 parts by weight of distilled water, 0.2 parts of HEC (which has been dissolved in water), 0.2 parts of 2,2′-azobis(2,4-dimethylvaleronitrile), 25 parts of Acrylonitrile, 5 parts of methyl methacrylate, 10 parts of α-methylstyrene, and 45 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2′-azobis(2,4-dimethylvaleronitrile), 5 parts of methyl methacrylate and 10 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 30.6% yield. The composition of the polymer was 26 acrylonitrile, 14 methyl methacrylate, 38 α-methylstyrene and 21 indene as determined by C¹³ NMR. The inherent viscosity was 0.186.

EXAMPLE C

A tetrapolymer was made by suspension polymerization according to the following recipe. Amounts are in weight parts per 100 parts of total monomers.

| PHM | Components |
|---|---|
| 150 | H₂O |
| 0.6 | 2,2′-azobis(2,4-dimethylvaleronitrile) |
| 0.2 | Hydroxylethylcellose (suspending agent) |
| 30 | Acrylonitrile |
| 15 | Methyl Methacrylate |
| 15 | α-Methylstyrene |

| PHM | Components |
| --- | --- |
| 40 | Indene |

150 parts by weight of distilled water, 0.2 parts of HEC (which has been dissolved in water), 0.2 parts of 2,2'-azobis(2,4-dimethylvaleronitrile), 30 parts of Acrylonitrile, and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 15 parts of methyl methacrylate and 15 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 49% yield. The composition of the polymer was 26 acrylonitrile, 15 methyl methacrylate, 21 α-methylstyrene and 38 indene as determined by $C^{13}$ NMR. The inherent viscosity was 0.213.

EXAMPLE D

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | Hydroxylethylcellose (suspending agent) |
| 30 | Acrylonitrile |
| 10 | Methyl Methacrylate |
| 30 | α-Methylstyrene |
| 30 | Indene |

150 parts by weight of distilled water, 0.2 parts of HEC (which has been dissolved in water), 0.2 parts of 2,2'-azobis(2,4-dimethylvaleronitrile), 30 parts of Acrylonitrile and 30 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 10 parts of methyl methacrylate and 30 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 54% yield. The composition of the polymer was 24 acrylonitrile, 6 methyl methacrylate, 42 α-methylstyrene and 28 indene as determined by $C^{13}$ NMR. The inherent viscosity was 0.215.

EXAMPLE E

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | Hydroxylethylcellose (suspending agent) |
| 30 | Acrylonitrile |
| 15 | Methyl Methacrylate |
| 15 | α-Methylstyrene |
| 40 | Indene |

150 parts by weight of distilled water, 0.2 parts of HEC (which has been dissolved in water), 0.2 parts of 2,2'-azobis(2,4-dimethylvaleronitrile), 30 parts of Acrylonitrile and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 15 parts of methyl methacrylate and 15 parts of α-methylstyrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 51% yield. The composition of the polymer in weight percent was 25 acrylonitrile, 16 methyl methacrylate, 28 α-methylstyrene and 31 indene as determined by $C^{13}$ NMR. The inherent viscosity was 0.210.

EXAMPLE F

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | Hydroxylethylcellose (suspending agent) |
| 25 | Acrylonitrile |
| 20 | Methyl Methacrylate |
| 10 | α-Methylstyrene |
| 45 | Indene |

150 parts by weight of distilled water, 0.2 parts of HEC (which has been dissolved in water), 0.2 parts of 2,2'-azobis(2,4-dimethylvaleronitrile), 25 parts of Acrylonitrile and 40 parts of indene were charged into a reactor provided with a stirrer. The reactor was purged with nitrogen, and was kept under nitrogen pressure. The temperature of the reactor was held for 5 minutes at 70° C. with stirring; then a monomer mixture comprising 0.4 parts of 2,2'-azobis(2,4-dimethylvaleronitrile), 20 parts of methyl methacrylate, 10 parts of α-methylstyrene and 5 parts of indene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained in a 40% yield. The composition of the polymer in weight percent was 22 acrylonitrile, 23 methyl methacrylate, 20 α-methylstyrene and 36 indene as determined by C$^{13}$ NMR. The inherent viscosity was 0.166.

35 parts by weight of the tetrapolymer was mixed with 65 parts of injection grade PVC and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, melt index, tensile strength and other physical properties, as noted below:

The HDT was 82° C., the melt index was 6.7, the tensile strength was 7,700 psi, the flexural strength was 5,300 psi and the flexural modulus 450,000 psi.

EXAMPLE G

A tetrapolymer was made by emulsion polymerization according to the following recipe. Amounts are in weight parts per 100 parts of total monomers.

| PHM | Components |
| --- | --- |
| 200 | H$_2$O |
| 2.5 | Sodium lauryl sulfate |
| 1.0 | Na$_2$S$_2$O$_8$ |
| 1.0 | Na$_3$PO$_4$.12H$_2$O |
| 25 | Acrylonitrile |
| 20 | Methyl Methacrylate |
| 30 | α-Methylstyrene |
| 25 | Indene |

200 parts by weight of distilled water, 2.5 parts of Sodium lauryl sulfate, 1.0 part of Na$_3$PO$_4$.12H$_2$O, 18 parts of acrylonitrile, 12 parts of methyl methacrylate, 8 parts of α-methylstyrene, 25 parts of indene and 0.7 parts of Na$_2$S$_2$O$_8$ were charged into a reactor provided with a stirrer. The reactor was purged with nitrogen, and was kept under nitrogen pressure. The temperature of the reactor was held at 75° C. for 1 hour with stirring; then a monomer mixture comprising 7 parts of acrylonitrile, 8 parts of methyl methacrylate and 22 parts of α-methylstyrene was incrementally added in portions into the reactor once every hour over a period of 5 hours through a syringe pump. At the third hour an additional 0.3 parts of Na$_2$S$_2$O$_8$ was added into the reactor for maintaining the reaction rate. The resulting mixture was allowed to react for 1.5 more hours more after the incremental additions. After completion of the reaction, the polymer was recovered through freeze coagulation of the latex. The polymer was filtered, and was then stirred with excess methanol overnight to remove residual monomers. The polymer was filtered again and dried in a vacuum over for 24 hours at 60° C. A powdery tetrapolymer was obtain in an 88 percent yield. Its composition, as determined by gas chromatograph analysis of redsidual monomers and the yield, was 25 acrylonitrile, 21 methyl methacrylate, 33 α-methylstyrene and 21 indene, all in weight percent. The inherent viscosity was 0.230.

25 parts by weight of the tetrapolymer was mixed with 75 parts of injection grade PVC and 3 parts of Thermolite 813 by a blender. The mixture was kneaded for 5 minutes with a mixing braabender having a surface temperature of 190° C. The resulting blend was press formed at 190° C. into a sheet, then a plaque. Each resin plaque thus prepared was tested for HDT, melt index, tensile strength and other physical properties, as noted below:

The HDT of the blend was 81.5° C., the tensile strength was 8,800 psi, the flexural strength was 14,300 psi and the flexural modulus 460,000 psi. The melt index of the blend was 5.1 g./10 min.

EXAMPLE H

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | Hydroxylethylcellose (suspending agent) |
| 25 | Acrylonitrile |
| 20 | Methyl Methacrylate |
| 10 | Styrene |
| 45 | Indene |

150 parts by weight of distilled water, 0.2 parts of HEC (which has been dissolved in water), 0.2 parts of 2,2'-azobis(2,4-dimethylvaleronitrile), 25 parts of Acrylonitrile, 10 parts of methyl methacrylate and 45 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 10 parts of methyl methacrylate and 10 parts of styrene is added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in avacuum oven for 24 hrs at 60° C. A powdery tetrapolymer was obtained in a 43 percent yield. The composition of the polymer in weight percent was 25 acrylonitrile, 28 methyl methacrylate, 7 styrene and 40 indene as determined by C$^{13}$ NMR. The inherent viscosity was 0.152.

EXAMPLE I

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | Hydroxylethylcellose (suspending agent) |
| 25 | Acrylonitrile |
| 10 | Methyl Methacrylate |
| 20 | Styrene |
| 45 | Indene |

150 parts by weight of distilled water, 0.2 parts of HEC (which has been dissolved in water), 0.2 parts of 2,2'-azobis(2,4-dimethylvaleronitrile), 25 parts of Acrylonitrile, 5 parts of methyl methacrylate, 2 of styrene and 45 parts of indene were charged into a reactor provided with a stirrer. The reactor was purged with nitrogen, and was kept under nitrogen pressure. The temperature of the reactor was held for 5 minutes at 65° with stirring; then a monomer mixture comprising 0.4 parts of 2,2'-azobis(2,4-dimethylvaleronitrile), 5 parts of methyl methacrylate and 18 parts of styrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 50 percent yield. The composition of the polymer in weight percent was 30 acrylonitrile, 13 methyl methacrylate, 22 styrene and 35 indene as determined by $C^{13}$ NMR. The inherent viscosity was 0.175.

EXAMPLE J

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | Hydroxylethylcellose (suspending agent) |
| 20 | Acrylonitrile |
| 20 | Methyl Methacrylate |
| 20 | Styrene |
| 40 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile and 40 parts of indene were charged into a reactor provided with a stirrer. The reactor was purged with nitrogen, and was kept under nitrogen pressure. The temperature of the reactor was held for 5 minutes at 65° C. with stirring. Then 20 parts of MMA was added at a constant rate with a syringe pump over a period of 8.5 hours and using another syringe pump 20 parts of styrene was added at a constant rate over a period of 11 hours. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 50 percent yield. The composition of the polymer in weight percent was 22 acrylonitrile, 24 methyl methacrylate, 23 styrene and 31 indene as determined by $C^{13}$ NMR. The inherent viscosity was 0.194.

25 parts by weight of the tetrapolymer was mixed with 75 parts of injection grade PVC (inherent viscosity 0.68 deciliters/gm) and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, melt index, tensile strength and other physical properties, as noted below:

The HDT was 77° C., the melt index was 4.1, the tensile strength was 9,400 psi, the flexural strength was 11,000 psi and the flexural modulus 450,000 psi.

EXAMPLE K

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile) |
| 0.2 | Hydroxylethylcellose (suspending agent) |
| 20 | Acrylonitrile |
| 10 | Methyl Methacrylate |
| 30 | Styrene |
| 40 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile and 40 parts of indene were charged into a reactor provided with a stirrer. The reactor was purged with nitrogen, and was kept under nitrogen pressure. The temperature of the reactor was held for 5 minutes at 65° C. with stirring. Then a monomer mixture comprising 0.4 parts of 2,2'-azobis(2,4-dimethylvaleronitrile), 10 parts of methyl methacrylate, and 30 parts of styrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 51 percent yield. The composition of the polymer in weight percent was 25 acrylonitrile, 15 methyl methacrylate, 35 styrene, and 25 indene, as determined by $C^{13}$ NMR. The inherent viscosity was 0.184.

EXAMPLE L

A tetrapolymer was made by suspension polymerization according to the following recipe. Amounts are in weight parts per 100 parts of total monomers.

| PHM | Components |
| --- | --- |
| 150 | $H_2O$ |
| 0.6 | 2,2'-azobis(2,4-dimethylvaleronitrile |
| 0.2 | Hydroxylethylcellose (suspending agent) |
| 20 | Acrylonitrile |
| 30 | Methyl Methacrylate |
| 20 | Styrene |
| 30 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile, 5 parts of of methyl methacrylate and 30 parts of indene were charged into a reactor provided with a stirrer. The reactor was purged with nitrogen, and was kept under nitrogen pressure. The temperature of the reactor was held for 5 minutes at 65° C. with stirring. Then a monomer mixture comprising 0.4 parts of 2,2'-azobis(2,4-dimethylvaleronitrile), 25 parts of methyl methacrylate, and 20 parts of styrene was added continually into the reactor over a period of 12 hours through a syringe pump. The resulting mixture was further allowed to react for 6 more hours. After completion of the reaction, the polymer obtained was dissolved into acetone, and reprecipitated in excess methanol. The polymer was filtered and dried in a vacuum oven for 24 hrs at 60° C. A powdery tetrapolymer was obtained in a 54 percent yield. The composition of the polymer in weight percent was 20 acrylonitrile, 29 methyl methacrylate, 14 styrene and 37 indene as determined by $C^{13}$ NMR. The inherent viscosity was 0.226.

25 parts by weight of the tetrapolymer was mixed with 75 parts of injection grade PVC (inherent viscosity 0.68 deciliters/gm) and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, melt index, tensile strength and other physical properties, as noted below:

The HDT was 78° C., the melt index was 4.3, the tensil strength was 9,600 psi, the flexural strength was 11,300 psi and the flexural modulus 450,000 psi.

When a mixture was prepared having 35 weight percent of the tetrapolymer, the HDT was 79.5° C., the melt index was 7.3, tensile strength was 9,100 psi, the flexural strength was 9,100 psi, and the flexural modulus was 460,000 psi.

EXAMPLE M

A tetrapolymer was made by suspension polymerization according to the following recipe. Amounts are in weight parts per 100 parts of total monomers.

| PHM | Components |
| --- | --- |
| 200 | H₂O |
| 0.2 | Hydroxylethylcellose (suspending agent) |
| 20 | Acrylonitrile |
| 30 | Methyl Methacrylate |
| 10 | Styrene |
| 40 | Indene |
| 0.6 | Catalyst: 2,5-dimethyl-2,5-bis(benzoylperoxy)hexane |

100 parts by weight of distilled water, 0.2 parts of HEC (which has been dissolved in 100 parts of water), 0.4 parts of the catalyst, 20 parts of Acrylonitrile, 7.5 parts of of methyl methacrylate and 40 parts of indene were charged into a reactor provided with a stirrer. The reactor was purged with nitrogen, and was kept under nitrogen pressure. The temperature of the reactor was held for 0.5 hours at 100° C. with stirring. Then a monomer mixture comprising 0.2 parts of the catalyst, 22.5 parts of methyl methacrylate, and 10 parts of styrene was added continually into the reactor over a period of 10 hours.

The polymer was allowed to settle and the water decanted. Thereafter the polymer was washed with methanol, filtered and dried. Conversion was 69 percent to the tetrapolymer having a composition in weight percent of 21 acrylonitrile, 40 methyl methacrylate, 9 styrene and 29 indene as determined by $C^{13}$ MMR. Its inherent viscosity was 0.154.

EXAMPLE N

A tetrapolymer was made by emulsion polymerization according to the following recipe in which amounts are shown in weight parts per 100 total parts of the monomers.

| | Total Charge PHM | Initial Charge PHM | Metering Syringe |
| --- | --- | --- | --- |
| Water | 297 | 297 | |
| Dioctylsulfosuccinate (75% soln. in ethanol) | 2.7 | 2.7 | |
| Acrylonitrile | 20 | 12 | 8 |
| Methyl Methacrylate | 30 | 18 | 12 |
| α-methylstyrene | 20 | 12 | 8 |
| Indene | 30 | 18 | 12 |
| Sodium persulfate (10%) | 10 | 4 | |

A 1-liter, 3-necked flask was fitted with a Teflon-bladed stirrer, a thermometer, a reflux condenser, a septum and a nitrogen inlet at the top of the condenser. The nitrogen line was fitted with a T and a water bubbler to maintain a constant, slight positive nitrogen pressure in the reactor. The reactor (3-necked flask) was suspended in a glycerol heating bath maintained at a constant temperature. A syringe metering pump was used to meter in part of the monomer during the polymerization.

The flask was charged with the water, emulsifier, and monomers and bubbled with a strong nitrogen stream to remove oxygen. The neck opening was capped with a rubber septum and the flask was heated. The flask contents were maintained under a nitrogen atmosphere and stirred at about 200 rpm. When the flask contents reached 65° C., 4 ml of a 10 percent solution of sodium persulfate was injected into the reactor. The reaction temperature remained constant at 65° C. throughout the reaction time.

After the reaction had progressed for 1 hour, the metering pump was turned on. The metering pump contained the quantity of monomer shown in the recipe. The monomer was metered into the reactor during a 13 hour period at a constant rate.

During the polymerization, the other 6 ml of catalyst (10 percent $Na_2S_2O_8$) was injected into the reactor in two equal portions; 3 ml at 4.25 hours and 3 ml at 7.75 hours.

At the end of the monomer metering period, the temperature and stirring was maintained for 8.75 additional hours. Then the polymer latex was allowed to cool. A total solids determination on the latex indicated a conversion of 80.4 percent.

$C^{13}$ NMR indicated a polymer composition of 21 percent acrylonitrile, 40 percent methyl methacrylate, 17 percent α-methylstyrene and 22 percent indene, all in weight percent.

The cooled latex was filtered through cheesecloth, collecting 3.5 parts by weight (when dried) of a finely-divided prefloc (powder when dried). After coogulation the polymer was later collected on a filter by vacuum filtration. The polymer particles were flushed with water then with methanol to remove water and monomer from the particle surfaces. The polymer particles were then stirred in some methanol and again filtered. The powder was then allowed to stand in methanol overnight to further soak out monomer. After again filtering and air drying, the polymer was dried overnight in a vacuum oven at 80° C. The product had the appearance of glistening, white sugary-type powder.

The inherent viscosity of the tetrapolymer (0.2 percent solution in DMF at 25° C.) was 0.205.

EXAMPLE O

A tetrapolymer was made by emulsion polymerization according to the following recipe in a 10 gallon, stainless steel reactor equipped with a heating jacket, and a stirrer.

|  | PHM Dry | PHM Wet | Total Charge (kg) | Initial Charge (kg) | Monomers Added (kg) |
| --- | --- | --- | --- | --- | --- |
| Water | — | 191 | 19.1 | 19.1 | — |
| Sodium Lauryl Sulfate | 3.0 | 3.0 | .25 | .25 | — |
| Na$_3$PO$_4$.12H$_2$O | 1.0 | 1.0 | .10 | .10 | — |
| Acrylonitrile | 25 | 25 | 2.5 | 2.0 | .5 |
| Methyl Methacrylate | 20 | 20 | 2.0 | 1.5 | .5 |
| α-Methyl Styrene | 30 | 30 | 3.0 | 1.0 | 2.0 |
| Indene | 25 | 25 | 2.5 | 2.5 | — |
| Sodium Persulfate (10%) | 1.2 | 12 | 1.2 | .6 | — |

The reactor was charged with the ingredients listed under initial charge in the recipe above, except for the persulfate catalyst. The reactor was buttoned down and the oxygen removed by alternately applying a vacuum and nitrogen pressure three times. The reactor was then pressure tested with nitrogen at 50 psi.

The stirrer was set at 150 ft/min tip speed, and heat applied. At 75° C., 600 g of 10 percent solution of the persulfate catalyst was added. Total solids were taken at intervals to follow the conversion; After the first hour 5 incremental additions of the added monomers were made each hour.

During the polymerization, the other 600 g of catalyst (10 percent Na$_2$S$_2$O$_8$) was injected into the reactor in two equal portions; 300 g at 2.5 hours and 300 g at 4.5 hours.

At the end of the monomer addition period, the temperature and stirring was maintained for 1 additional hour. Then the polymer latex was allowed to cool.

A gas chromatographic analysis of the unreacted monomers indicated a conversion of 88 percent, a polymer composition of 25 percent acrylonitrile, 21 percent methyl methacrylate, 33 percent α-methylstyrene and 21 percent indene.

The cooled latex was filtered through cheesecloth. The cooled latex was freeze coagulated, filtered and the polymer collected on a filter by vacuum filtration. The polymer particles were flushed with water then with methanol to remove water and monomer from the particle surfaces. The polymer particles were then stirred in some methanol and again filtered. The powder was then allowed to stand in methanol overnight to further soak out monomer. After again filtering and air drying, the polymer was dried overnight in a vacuum oven at 80° C. The product had the appearance of glistening, white sugary-type powder.

The inherent viscosity of the tetrapolymer was 0.256.

25 parts by weight of the tetrapolymer was mixed with 75 parts of injection grade PVC (inherent viscosity 0.68 deciliters/gm) and 3 parts Thermolite 813 by a blender. The mixture was kneaded for 5 minutes with a mixing brabender having a surface temperature of 190° C. into a sheet, then a plaque. Each resin plaque thus prepared was tested for HDT, melt index, tensile strength and other physical properties, as noted below:

The HDT was 81° C., the melt index was 6.0, the tensile strength was 9,300 psi, the flexural strength was 14,300 psi, and the flexural modulus was 460,000 psi.

EXAMPLE P

A tetrapolymer was made by emulsion polymerization according to the following recipe in which amounts are shown in parts by weight.

|  | PHM Dry | PHM Wet | Total Charge | Initial Charge | Metering Syringe |
| --- | --- | --- | --- | --- | --- |
| Water | — | 191 | 382 | 382 | — |
| Sodium Lauryl Sulfate | 2.5 | 2.5 | 5.0 | 5 | — |
| Na$_3$PO$_4$.12H$_2$O | 1.0 | 1.0 | 2.0 | 2 | — |
| Acrylonitrile | 25 | 25 | 50 | 36 | 14 |
| Methyl Methacrylate | 20 | 20 | 40 | 24 | 16 |
| α-Methyl Styrene | 30 | 30 | 60 | 16 | 44 |
| Indene | 25 | 25 | 50 | 50 | — |
| Sodium Persulfate (10%) | 1.0 | 10 | 20 | 10 | — |

A 1-liter, 3-necked flask was fitted with a Teflon-bladed stirrer, a thermometer, a reflux condenser, a septum and a nitrogen inlet at the top of the condenser. The nitrogen line was fitted with a T and a water bubbler to maintain a constant, slight positive nitrogen pressure in the reactor. The reactor (3-necked flask) was suspended in a glycerol heating bath maintained at a constant temperature. A syringe metering pump was used to meter in part of the monomer during the polymerization.

The flask was charged with the water, emulsifier, and monomers and bubbled with a strong nitrogen stream to remove oxygen. The neck opening was capped with a rubber septum and the flask was heated. The flask contents were maintained under a nitrogen atmosphere and stirred at about 200 rpm. When the flask contents reached 75° C., 10 ml of a 10 percent solution of sodium persulfate was injected into the reactor. The reaction temperature remained constant at 75° C. throughout the reaction time.

After the reaction had progressed for 0.5 hours, the metering pump was turned on. The metering pump contained the quantity of monomer shown in the recipe. The monomer was metered into the reactor during a 5 hour period at a constant rate.

After 2.5 hours polymerization, 5 ml of catalyst (10 percent Na$_2$S$_2$O$_8$) was injected into the reactor, and 5 ml after 4.5 hours.

At the end of the monomer metering period, the temperature and stirring was maintained for 1.0 additional hour. Then the polymer latex was allowed to cool. A total solids determination on the latex indicated a conversion of 87 percent.

A gas chromatographic analysis of the unreacted monomers indicated a conversion of 89 percent, a polymer composition of 25 percent acrylonitrile, 21 percent methyl methacrylate, 33 percent α-methylstyrene and 21 percent indene.

The cooled latex was filtered through cheesecloth, collecting 3.5 parts by weight (when dried) of a finely-divided prefloc (powder when dried). The polymer latex was freeze coagulated and later collected on a filter by vacuum filtration. The polymer particles were flushed with water then with methanol to remove water and monomer from the particle surfaces. The polymer particles were then stirred in some methanol and again filtered. The powder was then allowed to stand in methanol overnight to further soak out monomer. After again filtering and air drying, the polymer was dried overnight in a vacuum oven at 80° C. The product had the appearance of glistening, white sugary-type powder. The inherent viscosity of the tetrapolymer was 0.227.

Analysis of the polymer by gas chromatography (polymer dissolved in THF) showed that it contained about 0.21 percent indene monomer and no other monomers.

EXAMPLE Q

A tetrapolymer was made by emulsion polymerization according to the following recipe in which amounts are shown in weight parts per 100 total parts of the monomers.

| | |
|---|---|
| Water | 200 |
| Triton 770[a] | 0.33 |
| Acrylonitrile | 25 |
| Methyl Methacrylate | 20 |
| α-Methylstyrene | 30 |
| Indene | 25 |
| $Na_3PO_4.12H_2O$ | 1 |
| Sodium Persulfate | 1.3 |
| Sodium Lauryl Sulfate | 3 |

Sodium lauryl sulfate, the sodium phosphate and triton 770 were dissolved in water and charged to the reactor fitted with a cooling condenser. The reactor contents were placed under a nitrogen atmosphere. The reactor was charged with a monomer mixture consisting of 20 phm acrylonitrile, 15 phm methyl methacrylate, 10 phm α-methylstyrene and 25 phm indene. The contents of the reactor were heated to 75° C. and agitated with a mechanical stirrer.

Polymerization was initiated by adding 0.8 phm $Na_2S_3O_8$. A monomer mixture consisting of 5 phm acrylonitrile, 5 phm methyl methacrylate and 20 phm α-methylstyrene was introduced in measurements starting at 1 hour after the beginning of polymerization. The exact amounts were as following:

| | |
|---|---|
| 1 hour | 13.3% |
| 2 hours | 13.3% |
| 2.25 hours | 13.3% |
| 3 hours | 20% |
| 4 hours | 20% |
| 5 hours | 20% |

[a]sodium alkylaryl ether sulfate 30 percent, 2-propanol 23 percent and water 47 percent In addition, 0.3 phm and 0.2 phm of additional $Na_2S_2O_8$ were added at 3 hours and 5 hours, respectively.

After 7 hours the polymerization reached a monomer conversion of 87 percent as determined by the solids measurements. Its inherent viscosity was 0.206. Its composition in weight percent was 23 acrylonitrile, 29 methyl methacrylate, 32 α-methylstyrene and 16 indene, as measured by $C^{13}$ NMR.

25 parts by weight of the tetrapolymer was mixed with 75 parts of injection grade PVC (inherent viscosity 0.68 diciliters/gm) and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, melt index, tensile strength and other physical properties. The results were as noted below:

The HDT was 81° C., the melt index was 3.1, the tensile strength was 9,800 psi, the flexural strength was 8,200 psi and the flexural modulus was 460,000 psi.

EXAMPLE R

A tetrapolymer was made by emulsion polymerization according to the following recipe in which amounts are shown in weight parts per 100 total parts of the monomers.

| | |
|---|---|
| Water | 200 |
| Acrylonitrile | 25 |
| Methyl Methacrylate | 20 |
| α-Methylstyrene | 30 |
| Indene | 25 |
| $Na_3PO_4.12H_2O$ | 1 |
| Sodium Persulfate | 1.2 |
| Sodium Lauryl Sulfate | 3 |

Sodium lauryl sulfate and the sodium phosphate were dissolved in water and charged to the reactor fitted with a cooling condenser. The reactor contents were placed under a nitrogen atmosphere. The reactor was charged with a monomer mixture consisting of 20 phm acrylonitrile, 15 phm methyl methacrylate, 10 phm α-methylstyrene and 25 phm indene. The contents of the reactor were heated to 75° C. and agitated with a mechanical stirrer.

Polymerization was initiated by adding 0.7 phm $Na_2S_2O_8$. A monomer mixture consisting of 5 phm acrylonitrile, 5 phm methyl methacrylate and 20 phm α-methylstyrene was introduced in measurements starting at 1 hour after the beginning of polymerization. The exact amounts were as following:

| | |
|---|---|
| 1 hour | 20% |
| 2 hours | 20% |
| 3 hours | 20% |
| 4 hours | 20% |
| 5 hours | 20% |

In addition, 0.3 phm and 0.2 phm of additional $Na_2S_2O_8$ was added at 3 hours and 5 hrs, respectively.

After 6 hours the polymerization reached a monomer conversion of 88.7 percent as determined by the solids measurements. Its inherent viscosity was 0.228. Its composition in weight percent was 25 acrylonitrile, 21 methyl methacrylate, 35 α-methylstyrene and 20 indene, as measured by gas chromatography analysis of the residual monomers.

EXAMPLE S

A tetrapolymer was made by emulsion polymerization according to the following recipe in which amounts are shown in weight parts per 100 total parts of the monomers.

| | PHM |
|---|---|
| Water | 200 |
| Acrylonitrile | 25 |
| Methyl Methacrylate | 20 |
| α-Methylstyrene | 30 |
| Indene | 25 |
| $Na_3PO_4.12H_2O$ | 1 |
| Sodium Persulfate | 1.2 |
| Sodium Lauryl Sulfate | 3 |

Sodium lauryl sulfate and the sodium phosphate were dissolved in water and charged to the reactor fitted with a cooling condenser. The reactor contents were placed under a nitrogen atmosphere. The reactor was charged with a monomer mixture consisting of 17 phm acrylonitrile, 11 phm methyl methacrylate, 10 phm α-methylstyrene and 25 phm indene. The contents of the reactor were heated to 75° C. and agitated with a mechanical stirrer.

Polymerization was initiated by adding 0.7 phm Na$_2$S$_2$O$_8$. A monomer mixture consisting of 8 phm acrylonitrile, 9 phm methyl methacrylate and 20 phm α-methylstyrene was introduced in measurements starting at 1 hour after the beginning of polymerization. The exact amounts were as following:

| 1 hour  | 20% |
| 2 hours | 20% |
| 3 hours | 20% |
| 4 hours | 20% |
| 5 hours | 20% |

In addition, 0.3 phm and 0.2 phm of additional Na$_2$S$_2$O$_8$ was added at 3 hours and 5 hours, respectively.

After 7 hours the polymerization reached a monomer conversion of 88 percent as determined by the solids measurements. Its inherent viscosity was 0.224. Its composition in weight percent was 25 acrylonitrile, 21 methyl methacrylate, 36 α-methylstyrene and 18 indene, as measured by gas chromatography analysis of the residual monomers.

25 parts by weight of the tetrapolymer was mixed with 75 parts of injection grade PVC (inherent viscosity 0.68 diciliters/gm) and 3 parts of Thermolite 813 by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, melt index, tensile strength and other physical properties as noted below:

The HDT was 79.5° C., the melt index was 2.9, the tensile strength was 9,900 psi, the flexural strength was 14,300 psi and the flexural modulus was 430,000 psi.

In the following example the poly(vinyl chloride) used was a commercial extrusion grade PVC having an inherent viscosity of 0.93 deciliters/gram for a 0.2 weight percent solution in cyclohexanone measured at 25° C. When compounded with 3 parts of Thermolite 813 per 100 weight parts of PVC, the stabilized PVC had an HDT of 72° C., a tensile strength of 10,000 psi, a flexural strength of 13,700 psi and a flexural modulus of 460,000 psi. Its melt index was not measurable.

EXAMPLE T

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | Hydroxylethylcellose (suspending agent) |
| 20 | Acrylonitrile |
| 20 | Methyl Methacrylate |
| 20 | α-Methylstyrene |
| 40 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile, 10 parts of methyl methacrylate, 10 parts of α-methylstyrene, and 40 parts of indene were charged into a reactor provided with a stirrer. The reactor was purged with nitrogen, and was kept under nitrogen pressure. The temperature of the reactor was held for 5 minutes at 65° C. with stirring; then a monomer mixture comprising 0.4 parts of 2,2'-azobis(2,4-dimethylvaleronitrile), 10 parts of methyl methacrylate and 10 parts of α-methylstyrene was added continually into the reactor over a period of 10 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained. The composition of the polymer was 23 acrylonitrile, 20 methyl methacrylate, 34 α-methylstyrene and 22 indene as determined by C$^{13}$ NMR. The inherent viscosity was 0.172.

25 parts by weight of the tetrapolymer was mixed with 75 parts of extrusion grade PVC and 3 parts of Thermolite 813 by a blender. The mixture was kneaded for 5 minutes with mixing a brabender having a surface temperature of 190° C. The resulting blend was press formed at 190° C. into a sheet, then a plaque. A resin plaque thus prepared was tested for HDT, which was 80° C., melt index, tensile strength and other physical properties.

The HDT was 80° C., the melt index was 0.12 g./10 min, the tensile strength was 11,300 psi, the flexural strength was 16,300 psi and the flexural modulus 510,000 psi.

In the following example the poly(vinyl chloride) used was a commercial extrusion grade PVC having an inherent viscosity of 0.93, and when compounded with 3 weight parts the diisooctyl ester of dibutyltin dimercaptoacetic acid, (C$_8$H$_{17}$SCH$_2$COO)$_2$Sn(C$_4$H$_9$)$_2$, thermal stabilizer and 1 part of oxidized ethylene homopolymer lubricant per 100 parts of PVC, the stabilized PVC had an HDT of 67° C., a tensile strength of 9,400 psi, a flexural strength of 13,200 psi, and a flexural modulus of 430,000 psi. Its melt index was not measurable.

EXAMPLE U

A tetrapolymer was made by suspension polymerization according to the following recipe. Amounts are in weight parts per 100 parts of total monomers.

| PHM | Components |
| --- | --- |
| 150 | H$_2$O |
| 0.6 | 2,2'-azobis(2,4-dimethylvaleronitrile) |
| 0.2 | Hydroxyethylcellose (suspending agent) |
| 20 | Acrylonitrile |
| 30 | Methyl Methacrylate |
| 10 | Styrene |
| 40 | Indene |

150 parts by weight of distilled water, 0.2 parts of HEC (which has been dissolved in water), 0.2 parts of 2,2'-azobis(2,4-dimethylvaleronitrile), 20 parts of Acrylonitrile, 15 parts of methyl methacrylate, 2 parts of styrene, and 40 parts of indene were charged into a reactor provided with a stirrer. The reactor was purged with nitrogen, and was kept under nitrogen pressure. The temperature of the reactor was held for 5 minutes at 65° C. with strirring; then a monomer mixture comprising 0.4 parts of 2,2'-azobis(2,4-dimethylvaleronitrile), 15 parts of methyl methacrylate and 8 parts of styrene was added continually into the reactor over a period of 8 hours through a syringe pump. The resulting mixture was further allowed to react for 6 more hours. After completion of the reaction, the polymer obtained was dissolved into acetone, and reprecipitated in excess methanol. The polymer was filtered, and dried in a vacuum oven for 24 hours at 60° C. A powdery tetrapolymer was obtained. The composition of the polymer was 19 acrylonitrile, 41 methyl methacrylate, 16 styrene and 23 indene as determined by $C^{13}$ NMR. The inherent viscosity was 0.215.

25 parts by weight of the tetrapolymer was mixed with 75 parts of extrusion grade PVC and 3 parts of the diisooctyl ester of di-n-butyltin dimercaptoacetic acid as thermostabilizer and 1 part of oxidized ethylene homopolymer as lubricant by a blender. The mixture was kneaded for 5 minutes with a mixing brabender having a surface temperature of 190° C. The resulting blend was press formed at 190° C. into a sheet, then a plaque. Each resin plaque thus prepared was tested for HDT, melt index, tensile strength and other physical properties.

The HDT was 74.5° C., the melt index was 0.64 g./10 min, the tensile strength was 9,700 psi, the flexural strength was 12,100 psi and the flexural modulus 470,000 psi.

EXAMPLE V

A tetrapolymer was made by emulsion polymerization according to the following recipe in which amounts are shown in weight parts per 100 total parts of the monomer:

| | |
|---|---|
| Water | 190 |
| Acrylonitrile | 20 |
| Methyl Methacrylate | 26 |
| α-methyl Styrene | 43 |
| Indene | 11 |
| Sodium Persulfate | 0.6 |
| Na$_3$PO$_4$.12H$_2$O | 0.5 |
| Sodium Lauryl Sulfate | 2.4 |

Sodium lauryl sulfate and sodium phosphate were dissolved in water and charged to the reactor fitted with a cooling condenser. The reactor contents were placed under a nitrogen atmosphere. The reactor was charged with a monomer mixture consisting of 20 phm acrylonitrile, 26 phm methyl methacrylate, 21.5 phm α-methyl styrene and 11 phm indene. The contents of the reactor were heated to 75° C. and agitated with a mechanical stirrer. Polymerization was initiated by adding 0.4 phm Na$_2$S$_2$O$_8$. A monomer mixture consisting of 21.5 phm α-methyl styrene was introduced in 3 equal installments at 1 hour, 2 hours, and 3 hours.

In addition, 0.2 phm of additional Na$_2$S$_2$O$_8$ was added at 2 hours.

After 5.5 hours the polymerization reached a monomer conversion of 81 percent as determined by the solids measurement. Its composition in weight percent was 21.2 acrylonitrile, 27.2 methyl methacrylate, 43.9 α-methyl styrene and 7.7 indene, as determined by gas chromatographic analysis of the unreacted monomers. The inherent viscosity of the tetrapolymer was 0.37.

EXAMPLE W

A tetrapolymer was made by emulsion polymerization according to the following recipe in which amounts are shown in weight parts per 100 total parts of the monomer:

| | |
|---|---|
| Water | 200 |
| Acrylonitrile | 20 |
| Methyl Methacrylate | 25 |
| α-methyl Styrene | 50 |
| Indene | 5 |
| Sodium Persulfate | 0.4 |
| Na$_3$PO$_4$.12H$_2$O | 0.5 |
| Sodium Lauryl Sulfate | 3 |

Sodium lauryl sulfate and sodium phosphate were dissolved in water and charged to the reactor fitted with a cooling condenser. The reactor contents were placed under a nitrogen atmosphere. The reactor was charged with all the monomers and heated to 75° C. while stirred with a mechanical stirrer. Polymerization was initiated by adding 0.4 phm Na$_2$S$_2$O$_8$.

After one hour and ten minutes the polymerization reached a monomer conversion of 87 percent as measured by solids. Its composition is weight percent was 20 acrylonitrile, 25.3 methyl methacrylate, 51.4 α-methyl styrene and 3.3 indene, as measured by gas chromatographic analysis of the unreacted monomers. The inherent viscosity of the tetrapolymer was 0.32.

EXAMPLE X

A tetrapolymer was made by emulsion polymerization according to the following recipe in which amounts are shown in parts by weight.

| Parts by Weight | |
|---|---|
| 165 | Water |
| 30 | Acrylonitrile |
| 6 | Methyl Methacrylate |
| 6 | α-Methylstyrene |
| 60 | Indene |
| 0.36 | Calcium Phosphate |
| 0.005 | Sodium Dodecyl Sulfate |
| 0.3 | NaCl |
| 0.9 | 2,5-dimethyl-2,5-bis(benzoylperoxy)hexane |

All of the above components were charged into a 450 ml Parr reactor equipped with a stirrer. The reactor was purged with nitrogen, and was kept under 50 psi N$_2$ pressure at room temperature. The reactor was then heated and kept at 100° C. for 7 hours with stirring. The pressure of the reactor during polymerization was 90 psi. After completion of the reaction, the polymer obtained was dissolved into acetone, reprecipitated in methanol, and dried in vacuum oven for 24 hours. A powdery tetrapolymer was obtained. Its inherent viscosity was 0.13. The composition of the polymer in weight percent as indicated by $C^{13}$NMR was 26 acrylonitrile, 15 methyl methacrylate, 22 α-methylstyrene and 37 indene.

As will be evident to those skilled in the art, various modifications of this invention can be made or followed in the light of the foregoing disclosure and discussion without departing from the spirit and scope of the disclosure or from the scope of the claims.

We claim:

1. Low viscosity, random tetrapolymers that are the result of addition polymerization of the monomers acrylonitrile, methyl methacrylate, α-methylstyrene and/or styrene, and indene, containing the monomers combined in the polymer structure in the following weight percentages:

|  | Weight Percent |
| --- | --- |
| Acrylonitrile | 10–40 |
| Methyl methacrylate | 5–50 |
| Indene | 3–50 |
| α-methylstyrene or styrene or a mixture of both | 5–50 | wherein said tetrapolymers have an inherent viscosity in the range from 0.08 to 0.4 deciliters per gram of polymer solution.

2. Low viscosity, random tetrapolymers that are the result of addition polymerization of the monomers acrylonitrile, methyl methacrylate, α-methylstyrene and/or styrene, and indene, containing the monomers combined in the polymer structure in the following weight percentages:

|  | Weight Percent |
| --- | --- |
| Acrylonitrile | 15–35 |
| Methyl methacrylate | 5–45 |
| Indene | 5–45 |
| α-methylstyrene or styrene or a mixture of both | 5–45 | where the total weight percent of combined indene plus α-methyl styrene in the tetrapolymer is 38–70.

3. A tetrapolymer of claim 2 wherein the total weight percent of combined indene plus α-methyl styrene plus styrene is 45–60.

4. A tetrapolymer of claim 2 wherein the monomers are combined in the polymer structure in the following weight percentages:

|  | Weight Percent |
| --- | --- |
| Acrylonitrile | 20–30 |
| Methyl methacrylate | 15–30 |
| Indene | 10–30 |
| α-methylstyrene plus styrene | 15–40 |

5. A tetrapolymer of claim 4 wherein the total weight percent of combined indene plus α-methyl styrene plus styrene is 45–60.

* * * * *